United States Patent
White et al.

(10) Patent No.: US 12,165,214 B1
(45) Date of Patent: *Dec. 10, 2024

(54) SYSTEMS AND METHODS FOR CONFIGURING A LIFE INSURANCE SYSTEM

(71) Applicant: United Services Automobile Association (USAA), San Antonio, TX (US)

(72) Inventors: William S. White, San Antonio, TX (US); Jeremy S. May, San Antonio, TX (US); Matthew J. Kosub, San Antonio, TX (US); Sean W. Bell, San Antonio, TX (US); Greg A. Riedel, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,827

(22) Filed: Apr. 3, 2023

Related U.S. Application Data

(63) Continuation of application No. 16/678,240, filed on Nov. 8, 2019, now Pat. No. 11,669,908, which is a continuation of application No. 14/924,382, filed on Oct. 27, 2015, now Pat. No. 10,482,538.

(60) Provisional application No. 62/069,172, filed on Oct. 27, 2014.

(51) Int. Cl.
*G06Q 40/00* (2023.01)
*G06Q 40/08* (2012.01)

(52) U.S. Cl.
CPC .................................. *G06Q 40/08* (2013.01)

(58) Field of Classification Search
CPC .............................. G06Q 40/00; G06Q 40/08
See application file for complete search history.

(56) References Cited

U.S. PATENT DOCUMENTS

| | | |
|---|---|---|
| 7,797,174 B2 | 9/2010 | Samuels |
| 7,885,832 B2 | 2/2011 | Collins |
| 8,447,672 B2 | 5/2013 | DeLoach |
| 10,474,168 B1 | 11/2019 | Graham |
| 2005/0006206 A1 | 1/2005 | Balk |
| 2007/0094053 A1 | 4/2007 | Samuels |
| 2007/0168268 A1 | 7/2007 | Lange |
| 2007/0214072 A1 | 9/2007 | Stone |
| 2008/0082370 A1 | 4/2008 | Collins |

(Continued)

FOREIGN PATENT DOCUMENTS

CN 112446793 A * 3/2021

OTHER PUBLICATIONS

Chain of a lifetime: How blockchain technology might transform personal insurance M Mainelli, C Von Gunten—How Blockchain Technology Might . . . , 2014—papers.ssrn.com (Year: 2014).*

(Continued)

*Primary Examiner* — Lalita M Hamilton
(74) *Attorney, Agent, or Firm* — BakerHostetler

(57) ABSTRACT

Methods and systems for configuring non-contemporaneous analytics. An application is received from a consumer for a life insurance policy. An indication is sent to the consumer agreeing to activate the life insurance policy upon receipt of a notification of an activation trigger. An activation trigger is received and the policy is activated.

20 Claims, 2 Drawing Sheets

(56) References Cited

U.S. PATENT DOCUMENTS

2009/0106054 A1    4/2009    Sarel
2015/0154710 A1    6/2015    Samuels
2016/0078551 A1    3/2016    Samuels

OTHER PUBLICATIONS

M Mainelli, C Von Gunten—How Blockchain Technology Might . . . ,2014—papers.ssm.com (Year: 2014).
Hidden flipside; Bitcoin's futurethe Economist410.8878: 71(US). Economist Intelligence Unit N.A. Incorporated. (Mar. 15, 2014) (Year: 2014).
Riders, exchanges driving popularity of life policies By Katie Kuehner-Hebert. BenefitsPro Sep. 2, 2014: NA. (Year: 2014).
Blockchains, smart contracts, and the death of specific performance Hinkes, Andrew. Inside Counsel. Breaking News; New York (Jul. 29, 2014). (Year: 2014).

* cited by examiner

SYSTEMS AND METHODS FOR CONFIGURING A LIFE INSURANCE SYSTEM

CROSS-REFERENCE TO RELATED APPLICATIONS

This Application claims priority to and is a continuation of U.S. patent application Ser. No. 16/678,240, filed Nov. 8, 2019, which is a continuation of U.S. patent application Ser. No. 14/924,382, filed Oct. 27, 2015, which issued on Nov. 19, 2019, as U.S. Pat. No. 10,482,538, which claims priority to U.S. Patent Application No. 62/069,172, filed Oct. 27, 2014, which is hereby incorporated by reference in its entirety.

BACKGROUND OF THE INVENTION

As an individual's financial risks and responsibilities increase through family formation and other events, individuals often purchase additional life insurance at those moments to protect against the risk of the individual's premature death. However, life insurance policies purchased later in a person's life are often more expensive than life insurance policies purchased earlier in a person's life.

Accordingly, there is an unmet need to facilitate the ability for consumers to acquire reduced life insurance premiums for policies that are initiated later in a person's life.

BRIEF DESCRIPTION OF THE DRAWINGS

So that those having ordinary skill in the art, to which the present disclosure pertains, will more readily understand how to employ the novel system and methods of the present disclosure, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1:
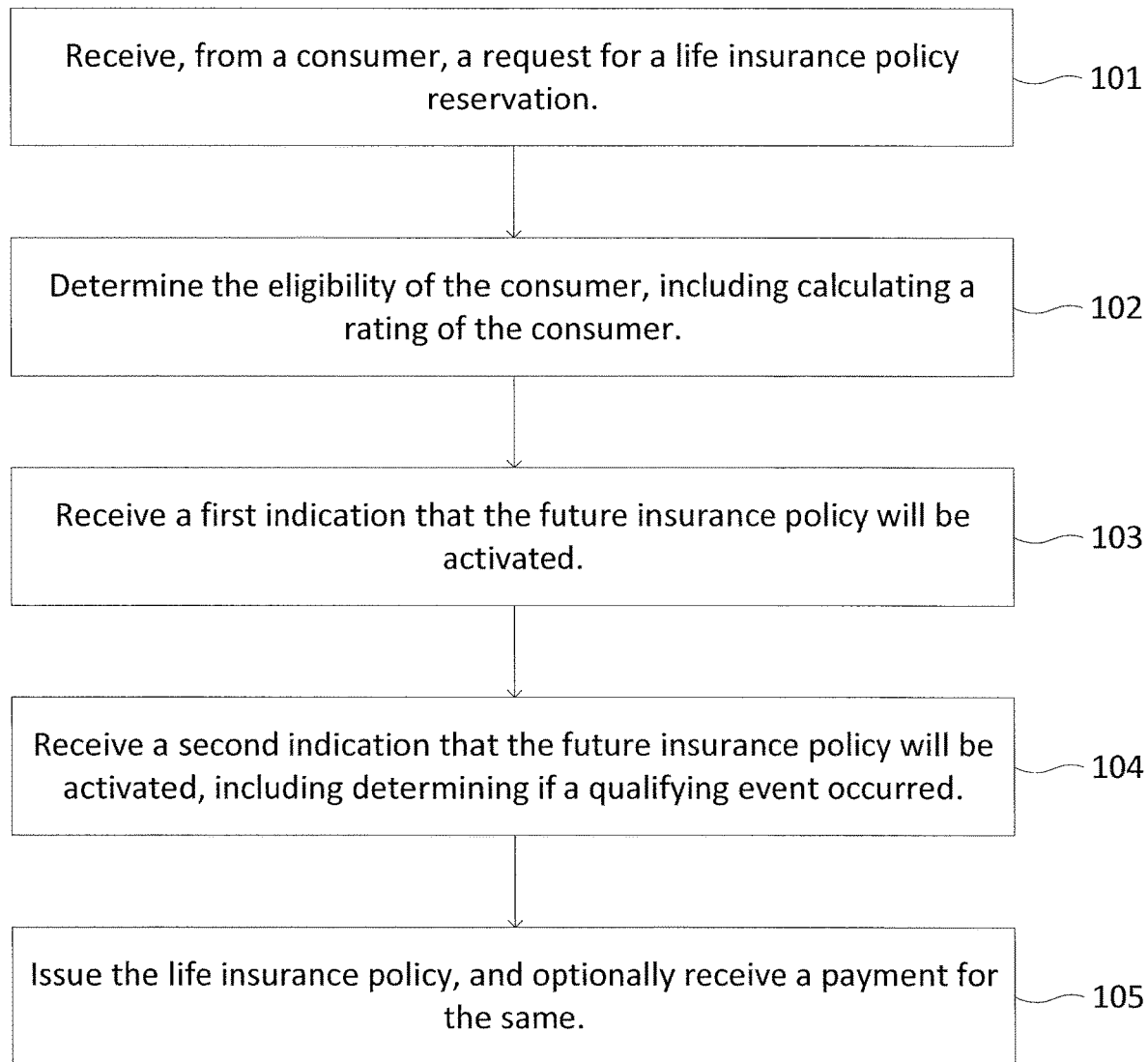
FIG. 1 is a flowchart depicting illustrative operation of a life insurance reservation system.

The present disclosure is directed to exemplary embodiments of a life insurance reservation system. It is to be appreciated the subject disclosure is described below more fully with reference to the accompanying drawings, in which illustrated embodiments of the present disclosure are shown. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this disclosure as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the disclosure based on the above-described embodiments. Accordingly, practicing this disclosure is not to be limited by what has been particularly shown and described, except as indicated by the appended claims. Further, although at least one series of steps are presented as an exemplary method of practicing one or more embodiments described herein, it will be appreciated by those skilled in the art that the steps identified may be practiced in any order that is practicable, including without limitation the omission of one or more steps.

The communications described and referenced herein, including without limitation the accompanying figures and drawings, may utilize and/or traverse networks that may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, one or more systems described herein is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to one or more systems described herein, or portions thereof, may be stored in a remote memory storage device such as storage medium. Communication links 75 may comprise either wired or wireless links.

Referring to FIG. 1, exemplary operation of a process 100 of one or more systems described herein will now be described for illustrative purposes. Starting at step 101, a company, such as via one or more servers, receives an indication that a consumer desires to reserve a future life insurance policy. This indication may arrive in the form of an application from the consumer, and in such situations the application may be generated by the consumer via the user's laptop, desktop, mobile phone, wearable electronic device, audio communications therewith (e.g., a phone call), and/or any means for communicating a consumer's possible interest in purchasing a product/service as would be recognized by those skilled in the art. It should be noted that the term consumer may refer to any entity that would like to purchase insurance. For instance, a consumer may be an individual or more than one individual. A consumer may be a legal entity, such as a corporation or institution, or a group of such entities. Moreover, the consumer does not necessarily have to be the insured. For instance, a consumer may reserve insurance on behalf of an insured.

Subsequently, the consumer's eligibility is determined (step 102). This determination may be based on the algorithms and/or models that have been previously generated, are generated contemporaneously with the request, and/or are generated subsequent to receiving an application. The determination may additionally and/or alternatively be based on data extracted from data sources that relate to financial, health/medical, and/or actuarial information related to one or more other consumers.

It is contemplated herein that the determination may result in an approved/denied dichotomous response and/or the determination may result in one or more grading factors. For example, the determination may include generating a risk assessment for the consumer, and the future life insurance policy's terms may be based at least in part on this risk assessment.

It is further contemplated herein that the determination may result in a grading factor for a specific time interval and/or time interval. For example, a consumer may receive a 7.8 risk assessment (out of ten) for the time range of 5 years to 10 years (i.e., if the future life insurance policy is eligible to be activated in 5 to 10 years), and a 6.4 risk assessment (out of ten) for the time range of 10 years to 15 years (i.e., if the future life insurance policy is eligible to be activated in 10 to 15 years), and/or a 4.8 risk assessment (out of ten) for the time range of 15 or more years (i.e., if the future life insurance policy is eligible to be activated in 15 or more years from now). Although specific risk assessment numbers (i.e., 7.8, 6.4, and 4.8), risk assessment ranges (i.e., "out of ten"), and time intervals (i.e., 5 to 10 years and 10 to 15 years and 15 or more years) are described in this example for illustrative purposes, it is contemplated herein that other risk assessment numbers, risk assessment ranges, and/or time intervals may be utilized in the practice of one or more embodiments described herein. For instance, the risk assessment may be a linear risk assessment or an exponential risk assessment.

Via step 103, the consumer purchases the right to acquire life insurance in the future and said purchase may constitute and/or include a first indication that the future life insurance policy will and/or may be activated in the future, including life insurance that may be only be activated upon the occurrence of one or more predetermined events, and in step 104, the one or more predetermined events occurs. In one example, the predetermined event is a change to the consumer's age (e.g., turns over 50 years old, over 60 years old, turns over 65 years old), a change in the age of a child of the consumer (e.g., turns over 18 years old, turns over 21 years old, turns over 25 years old), a change in the consumer's marital status, a change in the consumer's parental status, a change in the consumer's military affiliation, a change in the consumer's employment status, a change in the consumer's health, a change in the actuarial table applicable to the consumer, a change in the status of one or more policies, including life insurance policies, that are in effect with respect to the consumer, and/or substantial purchase (e.g., purchase of a home, vehicle).

Finally, the life insurance policy is issued (step 105), which may include receive one or more premium payments from the consumer (e.g., monthly payments).

Although this exemplary presentation included an activation trigger (e.g., steps 103 and/or 104) before the life insurance policy could be issued, it is contemplated herein that the both parties may simply agree to the terms with or without either side providing compensation to the other side to complete the agreement.

It should also be noted that upon occurrence of the event, the notification to insurer of the activation trigger may take various alternative forms. For instance, the terms and conditions covering the agreement may be a self-executing smart contract. If the activation trigger were to occur, the insurer may issue the policy upon notification that the particular active trigger occurred. In an exemplary self-executing transaction, the notification may include one or more methods of verifying that one or more activation triggers occurred. For example, the parties may specify that upon notification and/or verification from a birth registry database that the purchaser had a child, the life insurance policy would take effect. In another example, the parties may specify that upon a milestone birthday, the policy would take effect provided a search of records did not first determine that the consumer was deceased or dissolved. In a further example, the entities may elect to store the terms of the agreement to provide future insurance in a virtual ledger. In one example, the entities may use a blockchain of the type used to record Bitcoin transactions. The virtual ledger in one example may comprise a plurality of encoded blocks that represent data related to other insurance reservation transactions that have occurred.

In another example, the notification may occur by the consumer sending a notification (e.g. telephone call, email, postcard, etc.) directly to the insurance provider or through an intermediary. Upon receipt of the notification the policy may be activated manually or in an automated manner. In another example, the consumer may be able to activate a policy through logging into a system upon occurrence of the activation event and actuating a "one-click" operation to activate the policy.

It is contemplated herein that the steps described herein may be performed in series and/or iteratively, by which it is meant that the consumer may request a second quote for a future life insurance policy and/or an updated quote for future life insurance policy. This request for a second quote and/or an updated quote may occur, for exemplary purposes only and without limitation, contemporaneously with the original request, subsequent to the calculation of one or more risk factors associated with the consumer, subsequent to the consumer purchasing the possibility of enrolling in a future life insurance policy, subsequent to the predetermined eligibility event (e.g., the consumer turning an identified age) occurring, and/or at any point during the process(es) described herein.

Figure 2:
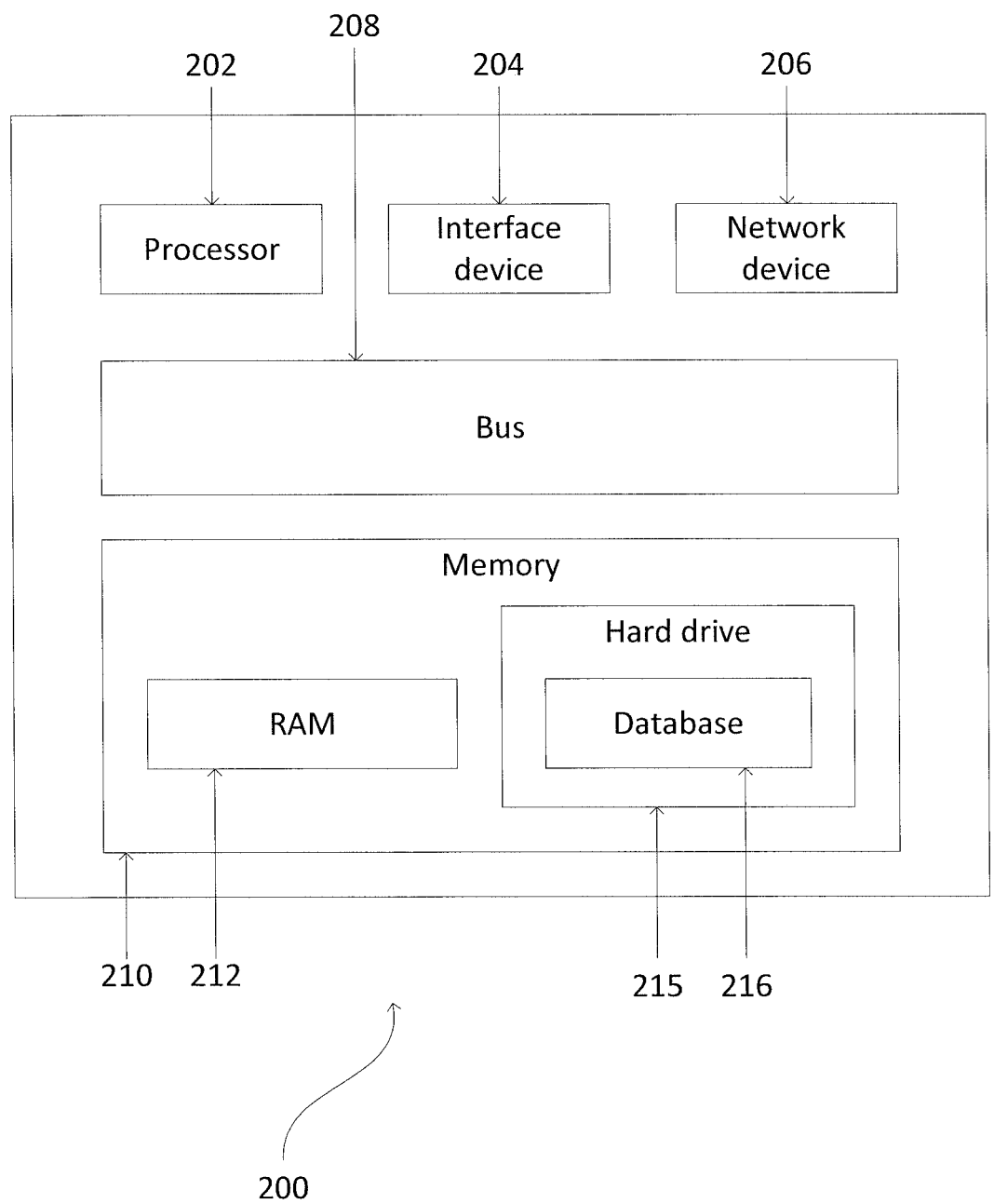
FIG. 2 depicts exemplary embodiments of a computing device that may be utilized in conjunction with FIG. 1.

Referring to FIG. 2, illustrated therein is an exemplary embodiment of a computing device as might be used when utilizing the systems and methods described herein. In one embodiment, computing device 200 includes memory 210, a processor 202, an interface device 204 (e.g., mouse, keyboard, monitor), a network device 206. Memory 210 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with a system, for instance, a telephone network, a local area network ("LAN"), the Internet, and/or a wireless network. In one example, memory 210 includes a series of computer instructions written in or implemented with any of a number of programming languages, as will be appreciated by those skilled in the art.

Memory 210 in one example includes RAM 212, hard drive 215, which may include database 216. Database 216 in one example holds information, such as information that relates to users and/or parties interacting with system.

It is contemplated that one or more of such computing devices 200 may be utilized to implement the functionality described herein. For example, in the instance of self-executing agreement, as described above, a first device 200 may be used by a consumer to request an insurance policy reservation. A second device 200 may be used by an insurer to accept an insurance policy reservation and to receive notification of an activation trigger. One or more third party devices 200 may be used to verify and/or notify the first device and/or the second device of the occurrence of the activation trigger. In addition, one or more third party devices 200 may be utilized to create a virtual ledger that stores the terms and conditions of the agreement, between the consumer and the insurer, for the insurer to provide future insurance. The devices 200 may communicate via wireless or wired networks.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 310 or separately in any of hardware (e.g., electronic circuitry), firmware, software, or a combination thereof. In one embodiment, engines/modules contain instructions for controlling processor 302 to execute the methods described herein.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject disclosure have been described with respect to the embodiments disclosed above, those skilled in the art will readily appreciate that changes and modifications may be made thereto without departing from the spirit and scope of the subject disclosure.

What is claimed is:

1. A method comprising:
generating one or more terms of an insurance policy for a user, wherein the one or more terms comprise an activation trigger;
receiving a blockchain entry comprising a self-executing smart contract, wherein the self-executing smart contract comprises the one or more terms and the blockchain entry is on a cryptocurrency blockchain comprising a plurality of encoded blocks representing data related to historical insurance policy transactions;
determining an occurrence of the activation trigger;
verifying, using at least one record stored to a database, the occurrence of the activation trigger;
based on verification of the occurrence of the activation trigger and the blockchain entry, causing activation of the insurance policy; and
issuing, to the user via a user input interface associated with the user and based on activation of the insurance policy, the activated insurance policy.

2. The method of claim 1, wherein the activation trigger is associated with at least one of the user reaching an age, a change in a marital status of the user, the user making a purchase, or the user having a child.

3. The method of claim 1, wherein the database comprises a birth registry database.

4. The method of claim 1, wherein the database comprises a death record.

5. The method of claim 1, wherein the cryptocurrency blockchain is a bitcoin blockchain.

6. The method of claim 1, wherein the causing activation of the insurance policy is further based on a "one-click" operation.

7. A method comprising:
generating a risk assessment associated with insuring a user for future intervals of time;
determining, based on the risk assessment, one or more terms of a future insurance policy for the user, wherein the one or more terms comprise an activation trigger;
receiving a blockchain entry comprising a self-executing smart contract, wherein the self-executing smart contract comprises the one or more terms and the blockchain entry is on a cryptocurrency blockchain comprising a plurality of encoded blocks representing data related to historical insurance policy transactions;
causing, based on an occurrence of the activation trigger and the blockchain entry, activation of the insurance policy; and
issuing, to the user via a user input interface associated with the user and based on activation of the insurance policy, the activated insurance policy.

8. The method of claim 7, wherein the risk assessment comprises a linear risk assessment.

9. The method of claim 7, wherein the risk assessment comprises an exponential risk assessment.

10. The method of claim 7, wherein the activation trigger is associated with at least one of the user reaching an age, a change in marital status of the user, the user making a purchase, or the user having a child.

11. The method of claim 7, wherein the cryptocurrency blockchain is a bitcoin blockchain.

12. The method of claim 7, wherein the causing activation of the insurance policy is based on verifying the occurrence of the activation trigger.

13. The method of claim 7, wherein the causing activation of the insurance policy is based on the activation trigger occurring during at least one of the future intervals of time.

14. The method of claim 7, wherein the determining, based on the risk assessment, the one or more terms of the future insurance policy for the user comprises determining a risk of the activation trigger occurring during one or more of the future intervals of time.

15. The method of claim 7, wherein the causing activation of the insurance policy is further based on a "one-click" operation.

16. A method comprising:
   receiving an indication of an interval of time;
   determining, based on the interval of time, a risk factor;
   receiving, based on the risk factor, a self-executing smart contract comprising one or more terms of an insurance policy for a user, wherein the one or more terms comprise an activation trigger and the self-executing smart contract is on a cryptocurrency blockchain comprising a plurality of encoded blocks representing data related to historical insurance policy transactions;
   causing, based on an occurrence of the activation trigger, execution of the self-executing smart contract; and
   issuing, to the user via a user input interface associated with the user and based on execution of the self-executing smart contract, the insurance policy.

17. The method of claim 16, further comprising determining, based on another interval of time, another risk factor;
   wherein the receiving the self-executing smart contract is further based on the another risk factor.

18. The method of claim 16, wherein the causing execution of the self-executing smart contract is based on the activation trigger occurring during the interval of time.

19. The method of claim 16, wherein the causing execution of the self-executing smart contract grants the user insurance coverage.

20. The method of claim 16, further comprising activating the insurance policy based on a "one-click" operation.

* * * * *